(12) United States Patent
Kendall et al.

(10) Patent No.: US 7,374,835 B2
(45) Date of Patent: May 20, 2008

(54) FUEL CELL ELEMENT

(76) Inventors: Kevin Kendall, Wycherley, Tower Road, Ashley Heath, Market Drayton (GB) TF9 4PY; Caine Finnerty, 124 Knox Ave., Buffalo, NY (US) 14216

( * ) Notice: Subject to any disclaimer, the term of this patent is extended or adjusted under 35 U.S.C. 154(b) by 733 days.

(21) Appl. No.: 10/494,607

(22) PCT Filed: Nov. 5, 2002

(86) PCT No.: PCT/GB02/04991

§ 371 (c)(1),
(2), (4) Date: May 4, 2004

(87) PCT Pub. No.: WO03/041190

PCT Pub. Date: May 15, 2003

(65) Prior Publication Data

US 2004/0247972 A1    Dec. 9, 2004

(51) Int. Cl.
  *H01M 8/10*    (2006.01)
  *H01M 2/00*    (2006.01)
  *H01M 2/02*    (2006.01)
(52) U.S. Cl. .......................................... 429/31; 429/34
(58) Field of Classification Search .................... None
    See application file for complete search history.

(56) References Cited

U.S. PATENT DOCUMENTS 4,640,875 A    2/1987  Makiel
4,774,153 A    9/1988  Sterzel
6,913,850 B2 *  7/2005  Sehlin et al. ................. 429/31

FOREIGN PATENT DOCUMENTS

| EP | 0 264 688    | 4/1988 |
| EP | 0 443 259    | 8/1991 |
| EP | 0 562 724    | 9/1993 |
| WO | WO 99/17390  | 4/1999 |

* cited by examiner

*Primary Examiner*—Stephen Kalafut
*Assistant Examiner*—Julian Mercado
(74) *Attorney, Agent, or Firm*—Simpson & Simpson, PLLC

(57) ABSTRACT

A fuel cell element comprising a tube of a solid electrolyte. An outer electrode is provided on an outside of the tube and an inner electrode is provided in the inside of the tube. A ring formed of an electrically conducting material is mounted to the tube and is electrically connected to the tube. The ring has a first surface intended to be mountable to and slidingly engageable with a substantially complementary shaped second surface of a wall of a conduit means to supply a gaseous consumable to an interior of the tube or to carry gas from the interior. The mounting of the ring to and the engaging of the ring with the second surface is to provide an electrical connection between the fuel cell element and the conduit means.

19 Claims, 7 Drawing Sheets

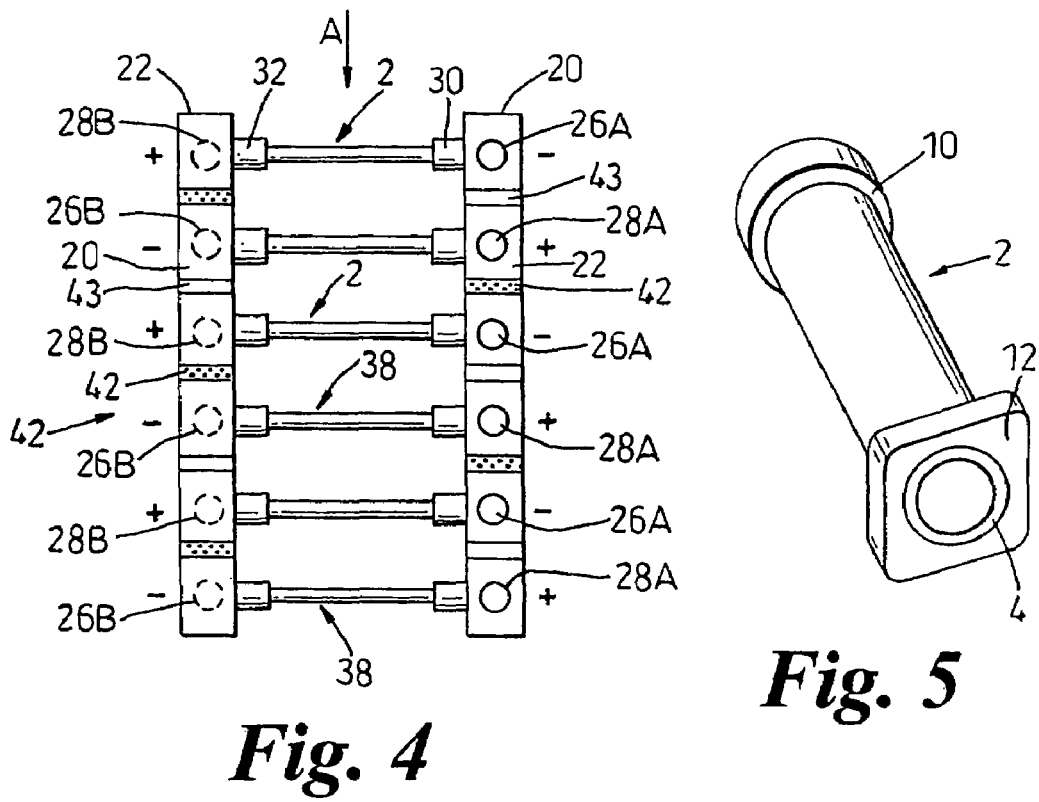
Fig. 4
Fig. 5
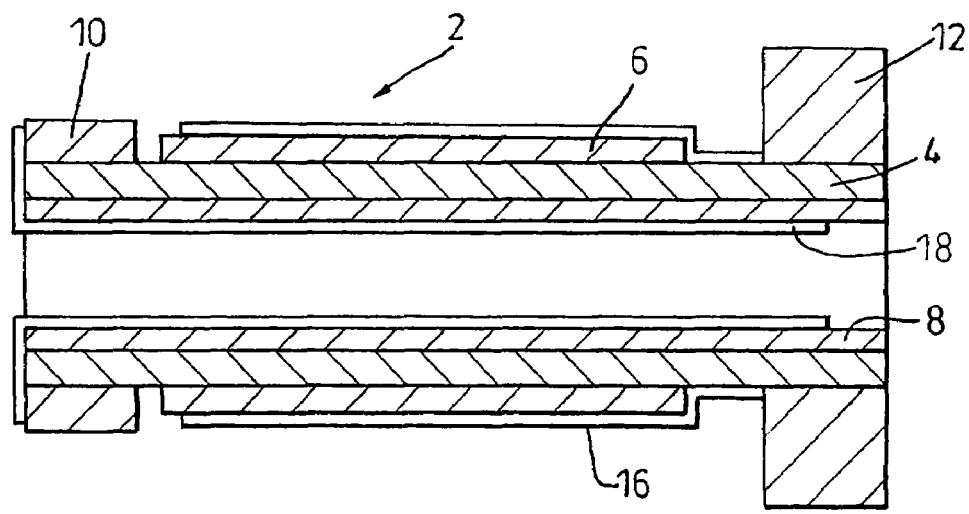
Fig. 6

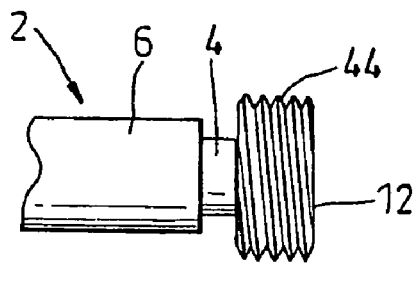
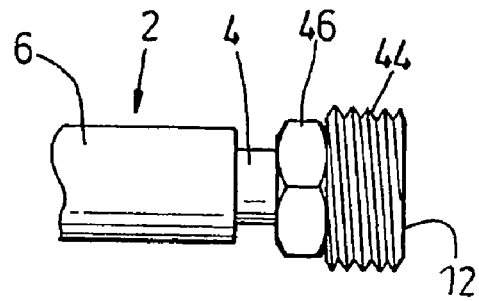
*Fig. 7*    *Fig. 8*
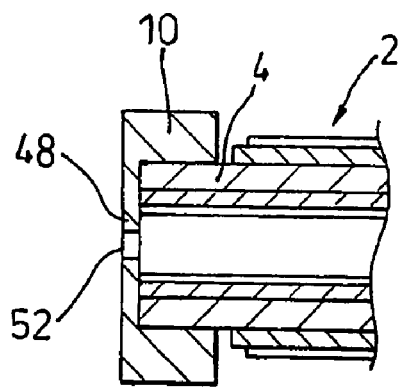
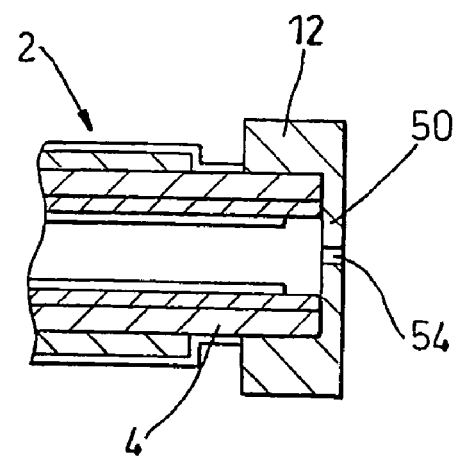
*Fig. 9*    *Fig. 10*

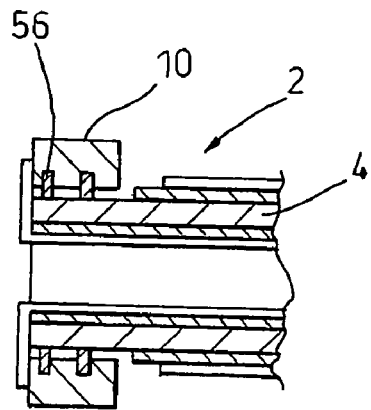
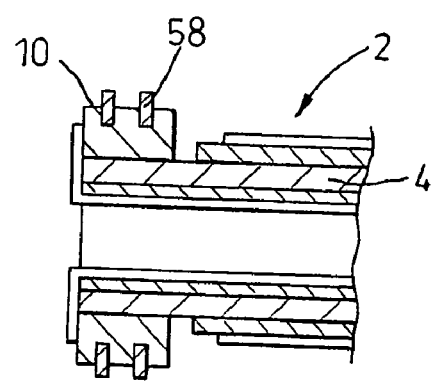
Fig. 11  Fig. 12
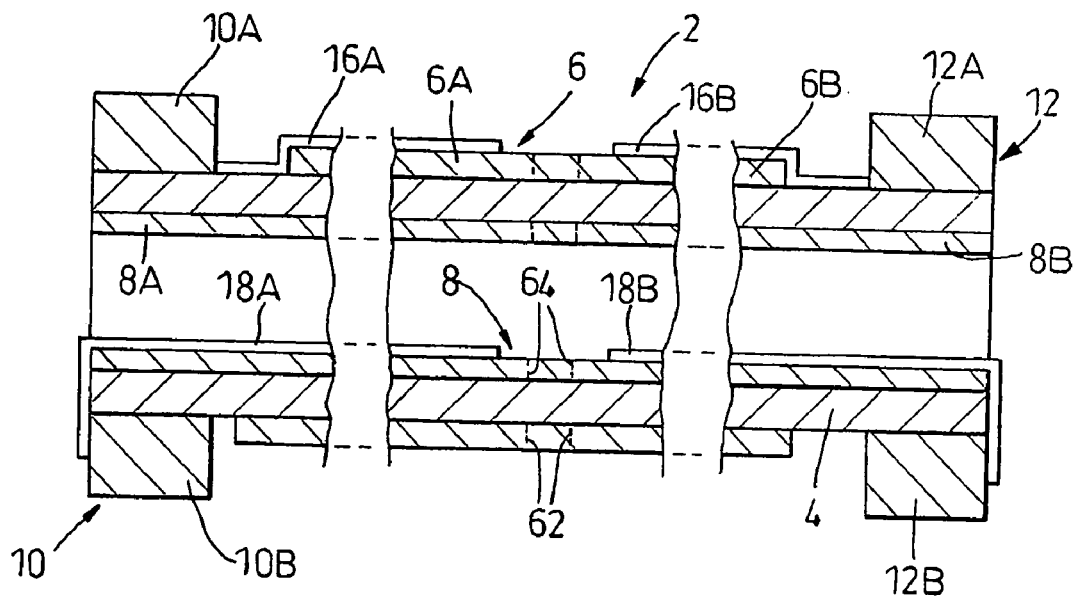
Fig. 13

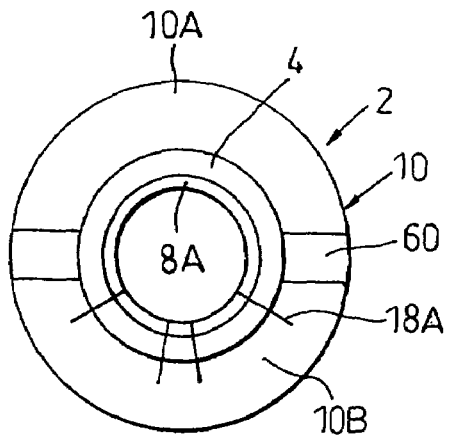
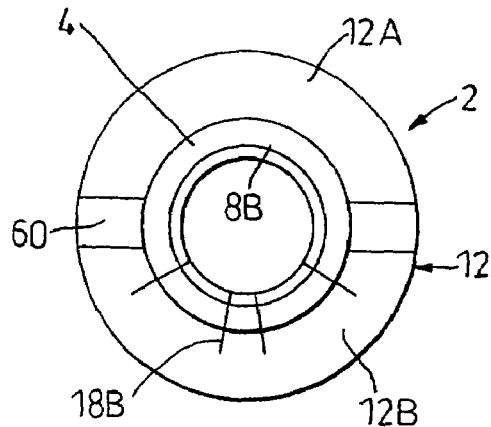
Fig. 14  Fig. 15
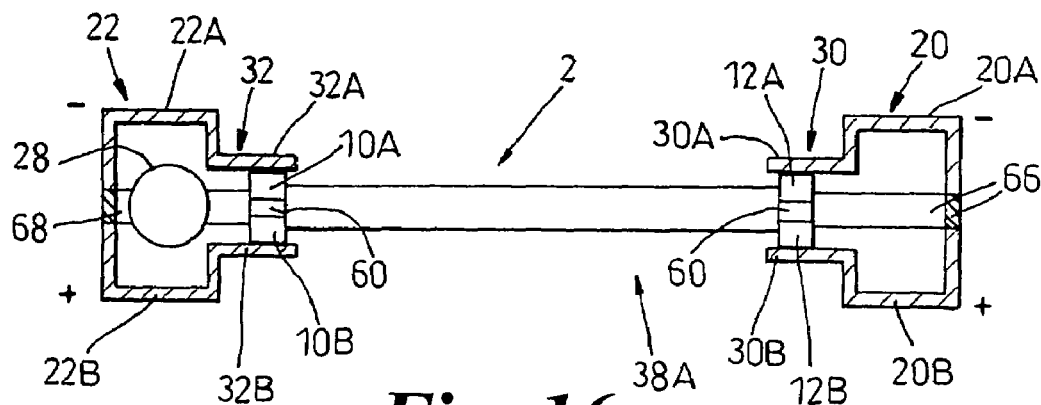
Fig. 16
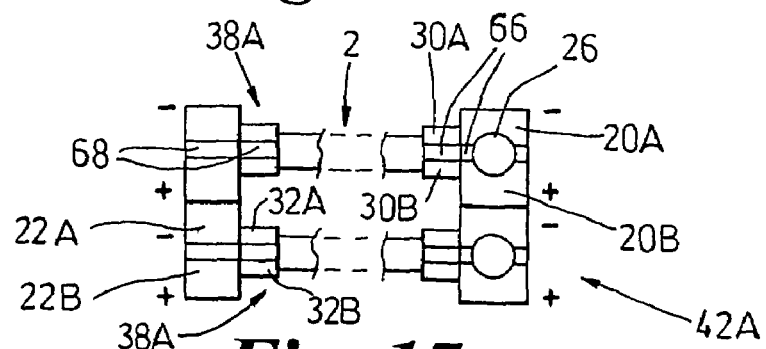
Fig. 17

US 7,374,835 B2

FUEL CELL ELEMENT

CROSS-REFERENCE TO RELATED APPLICATIONS

This application claims priority under International Application PCT/GB02/04991, filed 5 Nov. 2002, which claims priority from British Applications 0126604.8, filed 6 Nov. 2001, and 0212469.1, filed 30 May 2002.

TECHNICAL FIELD

This invention relates to a fuel cell element, a fuel cell comprising the element, and also a battery of the fuel cells.

BACKGROUND OF THE INVENTION

Fuel cell elements within a solid oxide fuel cell (SOFC) stack are made up of either planar or tubular elements which are stacked together in racks, One problem with such racks is the seals which separate fuel and oxidant compartments. Another problem is the electrical connections which must be made to the cells. Usually these two issues of sealing and electrical connection are solved separately. For example a standard planar stack described by de Haart et al, SOFC VII, eds. Yokokawa & Singhal, Electrochemical Society, Pennington N.J., 2001, p. 111-119 is sealed with glass around the plate edges while the electrical connection is made with metallic interconnect plates. Similarly in a Westinghouse design of tubular stack, the seal is made with a closed end tube into which an air feeder pipe extends, while the electrical connection is made using nickel mesh connectors outside the tubes. In U.S. Pat. No. 5,827,620, a small diameter tubular cell is sealed by a rubber joint at the cold end of the tube, whilst the electrical connection is made via wires passing inside and outside the tubes.

For their operation, fuel cells use gaseous consumables in the form of fuel and oxidant. Thus one gaseous consumable is an oxidant, for example oxygen or air, supplied to a cathode of the cell. Another gaseous consumable is the fuel, for example hydrogen or one or more compounds from which hydrogen can be obtained, supplied to an anode of the cell.

SUMMARY OF THE INVENTION

According to a first aspect of the invention a fuel cell element comprises a tube comprising solid electrolyte, an outer electrode on an outside of the tube, an inner electrode in an inside of the tube, a ring comprising electrically conducting material, the ring being mounted to the tube and being electrically connected to a the electrode, the ring having a surface (hereinafter referred to as a first surface) intended to be mountable to and slidingly engageable with a substantially complementary shaped surface (hereinafter referred to as a second surface) of a wall of conduit means to supply a gaseous consumable to an interior of the tube or to carry gas from the interior, and wherein the mounting of the ring to and engaging of the ring with the second surface is to provide an electrical connection between the fuel cell element and the conduit means.

The mounting of the ring to and engaging of the ring with the second surface may provide obstruction to leakage or passage of gas. For example a gaseous consumable, between the first and second surfaces. The obstruction may only be partial so at least some leakage or passage may occur. Or the obstruction may be substantially gas tight.

The ring may be disposed at or adjacent to an end of the tube. The ring may be substantially continuous or may be interrupted. The ring may extend substantially wholly or partially about an internal part of the tube. The ring may be provided on an exterior of the tube. The ring may be mounted at a substantially fixed position on the tube.

The solid electrolyte may be a solid oxide electrolyte.

The fuel cell element may be fittable to the conduit means by a relative push-fit movement between the ring mounted on the tube and the conduit means. The push-fit may comprise a substantially rectilinear relative movement between the ring and conduit means.

The fuel cell element may be fittable to the conduit means by a relative rotational, or relative rotary screw, movement between the ring and the conduit means.

The ring may be secured to the tube by adhesion or adherence thereto and/or by union therewith.

A joint or connection between the ring and the tube may be obstructive to passage of gas through the joint or connection. The joint or connection may be substantially gastight. Electrically conducting sealing means may be provided between the ring and the tube.

The ring may have an elongated portion suitable for insertion into the tube during use which portion acts as an injector for the gas and increases the pressure drop of the gas. The internal diameter of the elongated portion of the ring is preferably about one third of the internal diameter of the tube. Thus if the internal diameter of the tube is from 1.5 to 3.5 mm (preferably about 2 mm), the internal diameter of the elongated portion of the ring is from 0.5 to 1 mm (preferably about 0.6 mm).

The inner electrode is preferably provided with a projection into which the elongated portion of the ring may be inserted in use. The projection is generally formed from electrically conducting material such as metal foil or mesh. The projection is useful as it supports the elongated portion of the ring and provides an electrically conducting path between the inner electrode and the ring. Furthermore there is generally a gap between the projection and the inside of the tube which allows the elongated portion of the ring to expand during use when the fuel cell is operated at high temperature, which substantially reduces the risk of the elongated portion of the ring cracking the tube.

The first and second rings may be mounted on the tube. The first and second rings may be disposed at or adjacent to a respective end of the tube. The first ring may be electrically connected to one electrode, and the second ring may be electrically connected to the other electrode.

The first and second rings may be substantially similar.

The first and second rings may each be of a different shape and/or of a different size.

The interrupted ring may comprise at least first and second ring portions circumferentially spaced one from another and electrically insulated one from another. The first ring portion may be electrically connected to one electrode, and the second ring portion may be electrically connected to the other electrode.

At least one of the first and second rings may be an interrupted ring. Each of the first and second rings may be an interrupted ring.

The first and second interrupted rings may each have aforesaid first and second ring portions each electrically connected to a respective electrode.

The ring may have a form of or comprise an apertured cap.

The inner electrode may comprise at least two electrode portions spaced 30 one from the other.

The outer electrode may comprise at least two electrode portions spaced one from the other.

According to a second aspect of the invention a fuel cell comprises a fuel cell element according to the first aspect of the invention, conduit means to supply a gaseous consumable to an interior of the tube or carry gas from the interior, and the conduit means having the second surface with which the first surface of the ring is engaged by a sliding engagement providing an electrical connection between the fuel cell element and the conduit means.

The first and second surfaces may be so fitted together that there is provided an obstruction to passage of gas between the surfaces. The first and second surfaces may be in a substantially gas tight relationship. Electrically conducting sealing means may be provided between the first and second surfaces.

The first conduit means may be engaged by a first ring, and second conduit means may be engaged by a second ring.

The or a said ring may be provided on an exterior of the tube, and the second surface may be an internal surface of a tubular socket means.

A manifold for flow of gas therethrough may comprise a conduit provided with a plurality of the socket means.

The manifold may be a first manifold having a plurality of the first socket means, and another manifold may be a second manifold having a plurality of second the socket means, a plurality of the fuel cell elements each provided with a respective first and second rings, the first rings being each slidingly fitted into a respective first socket means, and the second rings being each slidingly fitted into a respective second socket means, whereby a combination of the manifolds and fuel cell elements forms a battery or rack of fuel cells.

A plurality of the batteries or racks may be stacked or otherwise superimposed one on another to form a larger battery or stack of fuel cells in which at least one manifold of a the rack is in electrical contact with at least one manifold of another rack.

BRIEF DESCRIPTION OF THE DRAWINGS

The invention will now be further described, by way of example, with reference to the accompanying drawings in which:

FIG. 4 is a diagrammatic end view of a battery of fuel cells comprising a plurality of the batteries or racks of the fuel cells in FIG. 3;

FIG. 5 is a perspective view of a second embodiment of a fuel cell element formed according to the first aspect of the invention;

FIG. 6 is a longitudinal section, similar to FIG. 1, of a third embodiment of a fuel cell element formed according to the first aspect of the invention;

FIG. 7 is a side elevation of a fragment of a fourth embodiment of a fuel cell element formed according to the first aspect of the invention;

FIG. 8 is a side elevation of a fragment of a modification of the fuel cell element in FIG. 7;

FIG. 9 diagrammatically shows a longitudinal section of an end fragment of a fifth embodiment of a fuel cell element formed according to the first aspect of the invention;

FIG. 10 diagrammatically shows a longitudinal section of an end fragment of a sixth embodiment of a fuel cell element formed according to the first aspect of the invention;

FIG. 11 diagrammatically shows a longitudinal section of an end fragment of a seventh embodiment of a fuel cell element formed according to the first aspect of the invention;

FIG. 12 diagrammatically shows a longitudinal section of an end 25 fragment of a eighth embodiment of a fuel cell element formed according to the first aspect of the invention;

FIG. 13 is a fragmentary longitudinal section of a ninth embodiment of a fuel cell element formed according to the first aspect of the invention;

FIGS. 14 and 15 are respectively views of opposite ends of the fuel cell element in FIG. 13;

FIG. 16 is a section of both (i) a fuel cell formed according to a 5 second aspect of the invention comprising the fuel cell element in FIG. 13 and (ii) a battery or rack of such fuel cells;

FIG. 17 is a diagrammatic end view of a battery of fuel cells comprising a plurality of the batteries or racks of the fuel cells in FIG. 16;

DESCRIPTION OF THE PREFERRED EMBODIMENTS

In the following description the same references identify similar or comparable parts.

Figure 1:
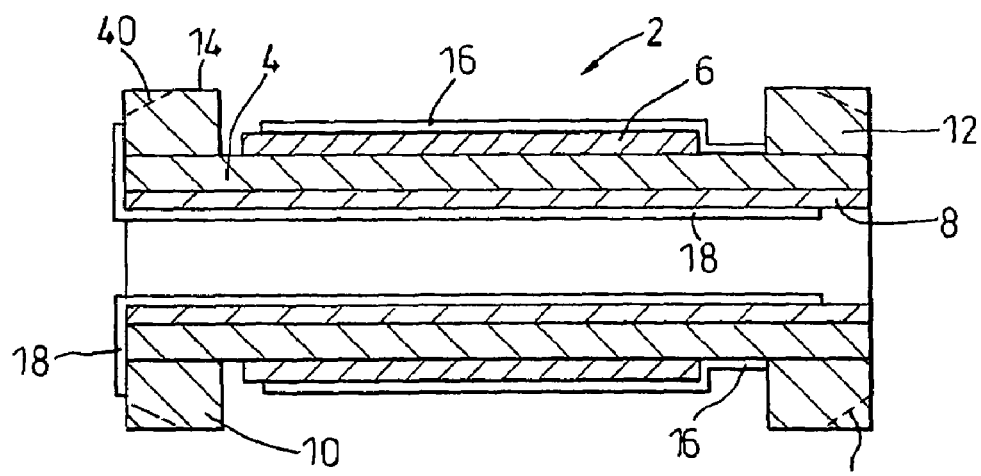
FIG. 1 is a longitudinal section of a fuel cell element formed according to the first aspect of the invention.

With reference to FIG. 1 a fuel cell element 2 comprises an open-ended tube 4 of solid electrolyte which may be a ceramic, for example a solid oxide electrolyte. The electrolyte tube 4 may be of any desired cross sectional shape, though conveniently it may be of substantially circular cross-section. An outer electrode 6 of any suitable kind may be applied about the exterior of the electrolyte tube 4 by any suitable method, and an inner electrode 8 of any suitable kind may be applied around the interior of the electrolyte tube by any suitable method. An annular ring or end cap 10 or 12, each with a substantially cylindrical outer face 14 is fitted onto the respective end of the electrolyte tube 4. The end caps or rings 10, 12 may be formed of any suitable electrically conducting material, for example, metal, graphite, a conducting ceramic material. The end caps 10, 12 may fit snugly on the electrolyte tube 4 and/or may be secured thereto. The end caps 10, 12, may be secured to the electrolyte tube 4 by, and/or may form with the electrolyte tube, substantially gas-tight, conducting joints, for example, comprising using any suitable sealing material or cement for example an electrically conducting ink or by an appropriate brazing or ceramic firing procedure whereby the rings are fixed on. Conducting ink may comprise graphite and/or metal particles or flakes. One or more electrical conductors or current collectors 16, which may be adhered in position, is/are in electrical contact with the outer electrode 6 and with the end cap or ring 12, and one or more electrical conductors or current collectors 18, which may be adhered in position, is/are in electrical contact with the inner electrode 8 and with the end cap or ring 10, for example with the end face of the ring 10 substantially coinciding with an end of the fuel cell element 2.

Figure 2:
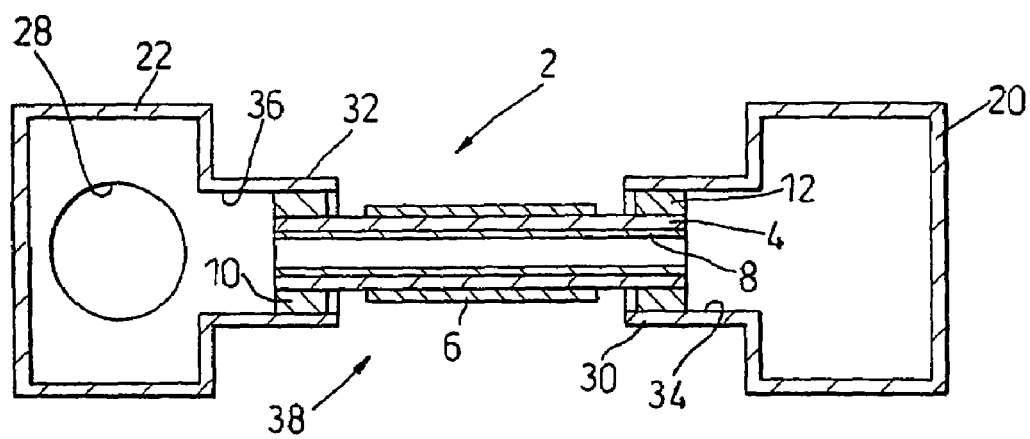
FIG. 2 is a section of both (i) a fuel cell formed according to a second aspect of the invention comprising the fuel cell element in FIG. 1 and (ii) a battery or rack of such fuel cells.
Figure 3:
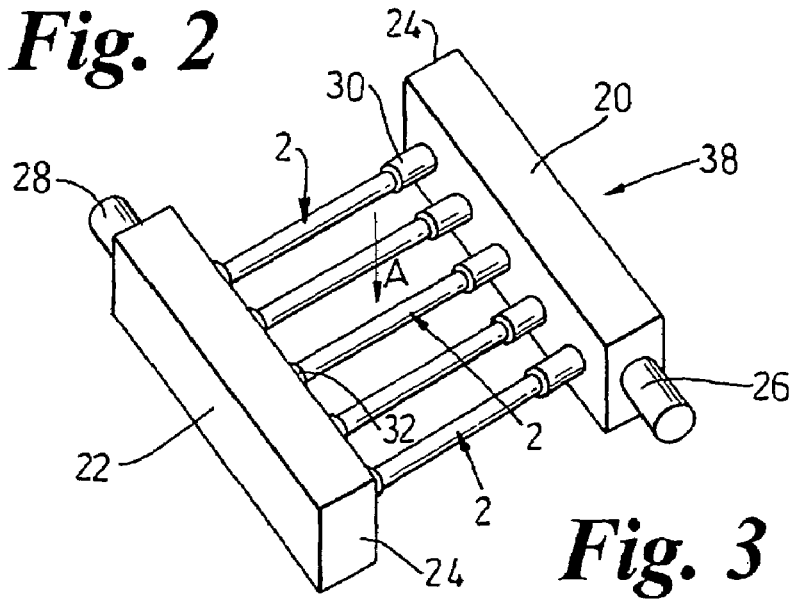
FIG. 3 is a perspective view from above of the battery or rack of fuel cells in FIG. 2.

With reference to FIGS. 2 and 3, a pair of substantially parallel spaced 20 conduits or manifolds are indicated at 20 and 22 each closed at one end 24 and having a respective pipe 26 or 28 opening into the respective other end. Each manifold 20 or 22 has a plurality of respective, spaced conduits or tubes 30 or 32 mounted on a side wall of the manifold and opening into the manifold interior. The tubes 30 and 32 provide sockets into which the ends of a plurality of the fuel cell elements 2 are fitted. The conduits 20, 22 and their sockets 30, 32 are of electrically conducting material, for example metal. The connector rings or end caps 10 or 12 fit into the sockets 30 or 32 and the wall of each socket 30 or 32 has an inner face 34 or 36 of a shape which substantially corresponds with or substantially complementary to the outer face or periphery of the corresponding end cap 10 or 12. The end caps 12 and the sockets 30 engage together as a push- or sliding-fit by a substantially rectilinear relative movement between the manifold 20 and a fuel cell element 2. Also the end caps 10 and the sockets 32 engage together as a push- or sliding-fit by a substantially rectilinear relative movement between manifold 22 and a fuel cell element 2. The connector rings or end caps 10, 12 may be a relatively close fit in the sockets 30, 32 so that there is an electrically conducting connection between the manifolds and the end caps. Also the fit may be so close as to provide obstruction to passage or leakage of gas between the sockets and end caps, though some leakage may be tolerated. To make the connection between the sockets 30, 32 and the end caps 12, 14 substantially gas tight suitable sealant, for example a conducting ink, may be introduced into the region between the end caps and sockets.

It can be seen from FIG. 3 that the fuel cell elements 2 and the manifolds 20, 22 together form a battery or rack 38 of fuel cells which is substantially flat.

The pipe 26 or 28 may act as inlet for a gaseous consumable which passes 20 from the respective inlet manifold down the fuel cell elements 2 which provide a gaseous output into the respective outlet manifold from whence that output leaves through pipe 28 or 26 acting as an outlet. This gaseous consumable may be fuel or oxidant depending on whether the electrode 8 is an anode or a cathode. For example, if the electrode 8 is an anode, then one of the manifolds 20 or 22 is a fuel inlet manifold and the other manifold is an exhaust or anode gas outlet manifold, and oxidant may be supplied to the exterior of the fuel cell elements as suggested by arrow A in FIGS. 3 and 4.

The manner in which the fuel cell elements 2 are connected to the manifold 20,22 can lend itself to automated assembly. Also the nature of the joints between the fuel cell elements 2 and the sockets 30, 32 allows for some tolerance in fitting the fuel cell elements and manifolds together and, during use, some relative movement between the manifolds and the fuel cell elements can take place which will prevent build up of thermal stress. As suggested by the dotted lines 40 in FIG. 1 either or both the rings or end caps 10, 12 may be shaped (for example chamfered, or otherwise at least partially reduced in thickness) to reduce stress concentration.

A plurality of batteries or racks 38 of fuel cells may be assembled and stacked on one another in appropriate electrical connection to form an even larger battery 42 of fuel cells as indicated in FIG. 4. The manifolds 20, 22 are shaped to allow convenient stacking and/or interengagement of the stacked racks 38, and each rack 38 may be formed as shown in FIG. 3 so the manifolds 20, 22 are of asymmetrical disposition whereby the alternating racks in FIG. 1 are each upside down and rotated horizontally through 1800 relative to the adjacent rack. In FIG. 4 electrical insulation, for example an insulating felt, is indicated at 42. The insulating felt may be an aluminium oxide felt. Electrically conducting distance pieces or shims are indicated at 43. The pipes 26 (FIG. 3) of one group of racks in FIG. 4 are indicated at 26A and the pipes 28 (FIG. 3) of that group (FIG. 4) at 28A, whereas the pipes 26 (FIG. 3) of another group of racks in FIG. 4 are indicated at 26B and the pipes 28 of that group indicated at 28B. Thus, gas which passes into or leaves the interior of the fuel cell elements 2 can be supplied or flow in the same direction, for example simultaneously, through the pipes 26A, 28A FIG. 4) and can be supplied or flow in the same direction, for example simultaneously through the pipes 26B, 28B.

If for example in FIG. 4, the electrodes 8 (FIG. 1) are anodes in the fuel cell element 2 gaseous fuel can be supplied to the fuel cell element through the pipes 26A, 28A simultaneously and anode gas leaves the battery 42 through the pipes 26B, 28B. In this example, the polarities of the different manifolds in the battery or fuel cell stack 42 are indicated by + or −.

The rings or end caps 10, 12 may have any desired external peripheral shape and/or may be any desired size.

The rings or end caps 10 and 12 on a given fuel cell element 2 may be of 10 a different shape and/or size the one relative to the other to ensure that the fuel cell element can only be mounted correctly oriented with respect to manifolds 20 and 22 to which it is desired it be connected. In FIG. 5 for example, the end caps 10 and 12 are of different shapes; for example the ring or end cap 12 has a substantially square outer periphery to slidingly fit into a correspondingly shaped socket 30 of a manifold 20 whereas the ring or end cap 10 has a substantially cylindrical or circular outer periphery slidingly fittable into a correspondingly shaped socket 32 of a manifold 22.

In FIG. 6 the end caps or rings 10, 12 are of different sizes to fit into respective correspondingly sized sockets.

In FIG. 7 the end cap 12 is cylindrical with an external screw thread 44 which screws onto an internal corresponding thread on an inside of a socket 30 of a manifold 20. The end cap 14 (not shown) at the other end of the fuel cell element 2 being preferably a rectilinear push-fit into its corresponding socket 32 of a manifold 32, for example that end cap 14 may have a circular profile allowing it to rotate in its corresponding socket 32 as the end cap 12 is screwed into place. The end cap 12 may be rotated by rotary motion applied to the fuel cell element by a hand or fingers gripping the element. In FIG. 8 the threaded end cap 12 has a nut or other tool engageable formation 46 integral or fast therewith for engagement by a spanner or other appropriate turning tool.

With reference to FIGS. 9 and 10 either end cap 10 or 12 may have a 5 central web 48 or 50 extending across the corresponding end of the electrolyte tube 4, which web has an aperture 52 or 54 therethrough through which gas may enter or leave the tube; which aperture 52 or 54 may be appropriately sized or shaped for regulating flow of gas therethrough in a desired manner.

In FIG. 11 an end cap or ring such as the ring 10 is shown provided with internal sealing in the form of one or more sealing rings 56, whereas in FIG. 12 one or more sealing rings 58 is/are shown fitted externally to the end cap. The rings 56, 58 are formed of electrically conducting material, for example graphite.

In FIG. 13, the fuel cell element 2 has connector rings or end caps 10, 12 either or both of which may be of an interrupted construction wherein the ring 10 is shown, for example, in FIG. 14 comprising two arcuate ring portions 10A and 10B of conducting material electrically insulated from one another by insulation 60. In FIG. 15 the ring or end cap 12 of FIG. 13 is shown comprising two electrically conducting arcuate portions 12A and 12B insulated one from the other by insulation 60. The outer electrode 6 has two sets of current collectors 16A and 16B, one set connected to the ring portion 10A and the other set connected to the ring portion 12A. If desired, the outer electrode 6 may comprise two electrode portions 6A and 6B interrupted or spaced apart at the region or annular gap demarcated by dotted lines 62. The inner electrode 8 has two sets of current collectors 18A and 18B, one set connected to the ring portion 10B and the other set connected to the ring portion 12B. If desired, the inner electrode 8 may comprise two electrode portions 8A and 8B interrupted or spaced apart at the region or annular gap demarcated by dotted lines 64. Since the element 2 in FIGS. 13 to 15 allows electrical power to be taken from each end, the configuration is particularly suited for fuel cell elements 2 which are relatively long.

The fuel cell element 2 of FIG. 13 is fitted into the manifolds 20 and 22 in FIG. 16. There the manifold 20 and its sockets 30 are divided into an upper or first manifold and socket portion 20A, 30A of conducting material and a lower or second manifold and socket portion 20A 30B of conducting material spaced by electrical insulating material 66 from the first manifold and socket portion. The manifold 22 and its sockets 32 are divided into an upper or first manifold and socket portion 22A, 32A of conducting material and a lower or second manifold or socket portion 22B, 32B of conducting material spaced by insulating material 68 from the first manifold and socket portion 22A, 32A. A plurality of fuel cell elements 2 (FIG. 13) are connected by push fitting to the sockets 30 and 32 of the manifolds 20, 22 to form a battery or rack 38A of fuel cells broadly comparable in configuration to the rack 38 of fuel cells in FIG. 3. In FIG. 16, the upper end cap or ring portion 10A of a fuel cell element 2 is in electrical contact with an upper socket portion 32A and the lower end cap or ring portion 10B is in electrical contact with the corresponding lower socket portion 32B and the upper end cap or ring portion 12A is in electrical contact with an upper socket portion 30A, and the lower end cap or ring portion 12B is in electrical contact with the corresponding lower socket portion 30B. If, in the rack 38A, the inner electrode of each fuel cell element 2 is an anode and fuel is supplied to the interior of the fuel cell elements through either manifold 20 or 22, the polarities appearing at the upper and lower portions 20A and 20B, 22A and 22B of the manifolds are indicated by + or −

In FIG. 17 the batteries or racks 38A are mounted one on another to form a stack or even larger battery 42A of fuel cells in which the racks 38A are all the same way up and same way round whereby the lower manifold portions 20B, 22B of one rack sit in electrical contact on and with the corresponding upper manifold portions 20A, 22A of the rack immediately adjacent or below.

Figure 18:
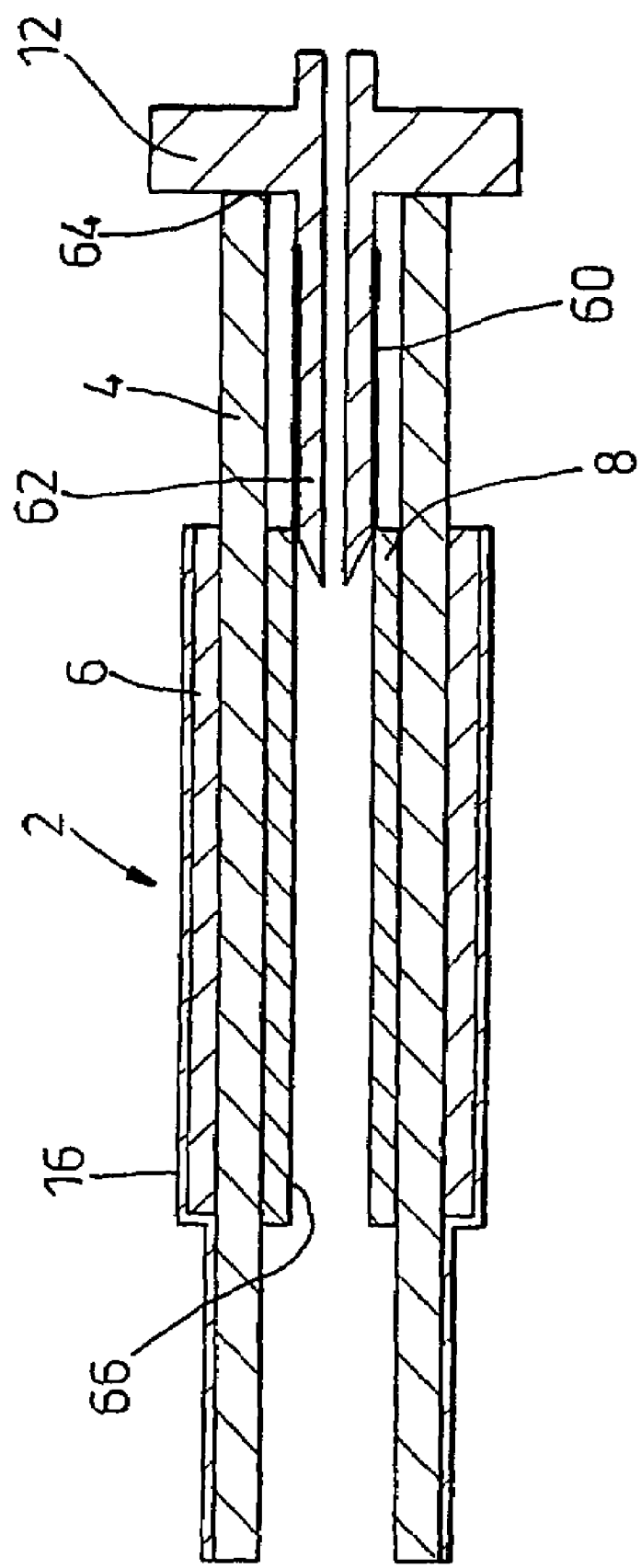
FIG. 18 is a fragmentary longitudinal section of a tenth embodiment of a fuel cell element formed according to the first aspect of the invention.

In FIG. 18, the end cap 12 engages with end surface 64 of the tube 4. The end cap 12 has an elongated portion 62 which extends inside tube 4 and acts as a gas injector. The inner electrode 8 has a projection 60 which is of metal mesh projecting axially along, the tube 4 from the inner surface 66 of the inner electrode 8. The elongated portion 62 of the end cap 12 is inserted inside projection 60 within the tube. Projection 60 aligns the elongated portion 62 and provides an electrical connection between the end cap 12 and the inner electrode 8.

Figure 19:
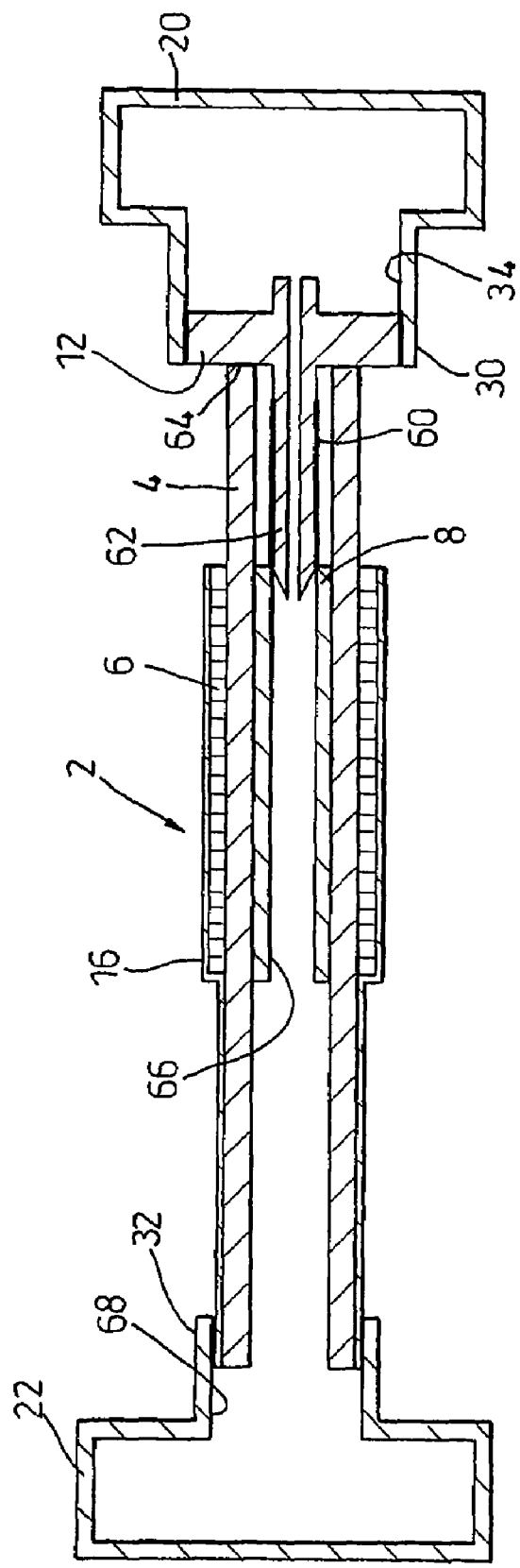
FIG. 19 is a section of both (i) a fuel cell formed according to a second aspect of the invention comprising the fuel cell element in FIG. 18 and (ii) a battery or rack of such fuel cells.

In FIG. 19, conduit or manifold 22 has a plurality of respective, spaced conduits or tubes 32 mounted on a side wall of the manifold and opening into the manifold interior. The tubes 32 provide sockets into which the ends of a plurality of the fuel cell elements 2 are fitted. The fuel cell elements 2 fit into the sockets 32 and the wall of each socket 32 has an inner face 68 of a shape which substantially corresponds with or substantially complementary to the outer face or periphery of the fuel cell element 2.

The invention claimed is:

1. A fuel cell element, which comprises a continuous open planar tube with openings at opposing first and second terminal ends thereof, said tube having an open interior running the length of said tube allowing the transmission of gases therethrough, said fuel cell element comprising a solid electrolyte, said tube having an exterior side and an interior side, an outer electrode on said exterior side of said tube, an inner electrode on said interior side of said tube, at least one ring comprising electrically conducting material, said ring being mounted to said tube and electrically connected to one of said electrodes, said ring having a first surface for engaging with a substantially complementary shaped second surface of conduit means to supply a gaseous consumable to an interior of said tube or to carry a gas therefrom, and wherein the mounting of said ring to and engaging of said ring with said conduit means provides an electrical connection between said fuel cell element and said conduit means.

2. The fuel cell element according to claim 1, wherein said mounting of said ring to and engaging of said ring with the second surface is adapted to provide an obstruction to leakage or passage of gas.

3. The fuel cell element according to claim 1, wherein said ring is disposed at or adjacent to an end of said tube.

4. The fuel cell element according to claim 1, wherein said ring is substantially continuous.

5. The fuel cell element according to claim 1, wherein said solid electrolyte is a solid oxide electrolyte.

6. The fuel cell element according to claim 1, wherein said fuel cell element is fittable to said conduit means by a relative push-fit movement between said ring mounted on said tube and said conduit means.

7. The fuel cell element according to claim 1, wherein said fuel cell element is fittable to said conduit means by a relative rotational, or relative rotary screw movement between said ring and said conduit means.

8. The fuel cell element according to claim 7, wherein a joint or connection between said ring and said tube is obstructive to passage of gas through said joint or connection.

9. The fuel cell element according to claim 1, wherein said ring comprises an elongated portion for insertion into said tube during use which portion acts as an injector for gas.

10. The fuel cell element according to claim 1, comprising first and second said rings disposed at or adjacent to respective ends of said tube.

11. The fuel cell element according to claim 1, wherein said outer electrode comprises at least two electrode portions spaced one from the other.

12. A fuel cell, which comprises a fuel cell element according to claim 1.

13. A rack of fuel cells comprising a plurality of fuel cell elements according to claim 1.

14. A battery comprising a plurality of racks of fuel cells according to claim 13.

15. The fuel cell element according to claim 1, wherein said at least one said ring comprises an apertured cap.

16. The fuel cell element according to claim 1, wherein said inner electrode comprises at least two electrode portions spaced one from the other.

17. A fuel cell element, which comprises a tube with a solid electrolyte, said tube having an exterior side and an interior side, an outer electrode on said exterior side of said tube, an inner electrode on said interior side of said tube, at least one ring comprising electrically conducting material, said ring being mounted to said tube and electrically connected to one of said electrodes, said ring comprising an elongated portion for insertion into said tube during use which portion acts as an injector for gas, said inner electrode being provided with a projection into which said elongated portion of said ring may be inserted, said ring having means for engaging with a substantially complementary shaped conduit means to supply a gaseous consumable to an interior of said tube or to carry a gas therefrom, and wherein the mounting of said ring to and engaging of said ring with said conduit means provides an electrical connection between said fuel cell element and said conduit means.

18. A fuel cell element, which comprises a tube with a solid electrolyte, said tube having an exterior side and an interior side, an outer electrode on said exterior side of said tube, an inner electrode on said interior side of said tube, first and second rings comprising electrically conductive material and disposed at or adjacent to respective ends of said tube, said first ring electrically connected to one of said electrodes and the second ring electrically connected to the other of said electrodes, said rings having means for engaging with a complementary shaped conduit means to supply a gaseous consumable to an interior of said tube or to carry a gas therefrom, and wherein the mounting of said rings to and engaging of said ring with said conduit means provides an electrical connection between said fuel cell element and said conduit means.

19. A fuel cell element, which comprises a tube, a solid electrolyte, said tube having an exterior side and an interior side, an outer electrode on said exterior side of said tube, an inner electrode on said interior side of said tube, at least one ring comprising electrically conductive material, wherein said ring is an interrupted ring comprising at least first and second ring portions circumferentially spaced from one another and electrically insulated one from the other, wherein said first ring portion is electrically connected to one of said electrodes and said second ring portion electrically connected to the other said electrode, said rings having means for engaging with a substantially complementary shaped conduit means to supply a gaseous consumable to an interior of said tube or to carry gas therefrom, and wherein the mounting of said ring to and engaging of said ring with said conduit means provides an electrical connection between said fuel cell element and said conduit means.

* * * * *